July 9, 1957 V. SCHRECKENGOST ET AL 2,798,739
KNOCKDOWN BICYCLE CONSTRUCTION
Filed May 18, 1953 2 Sheets-Sheet 2
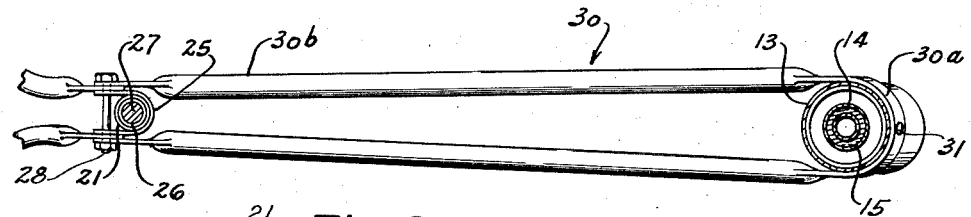
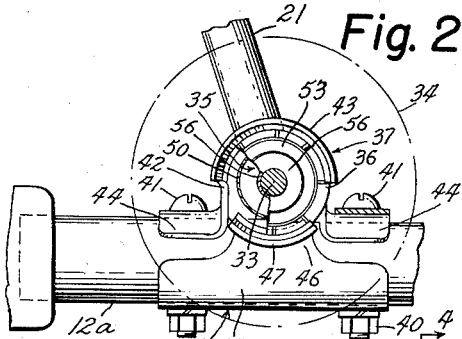
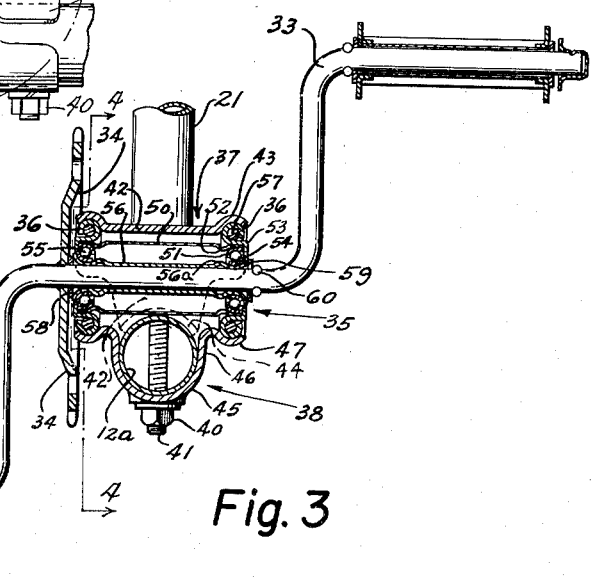
INVENTORS.
VIKTOR SCHRECKENGOST
GILBERT B. HAHN
BY
Albert R. Golrick
ATTY.

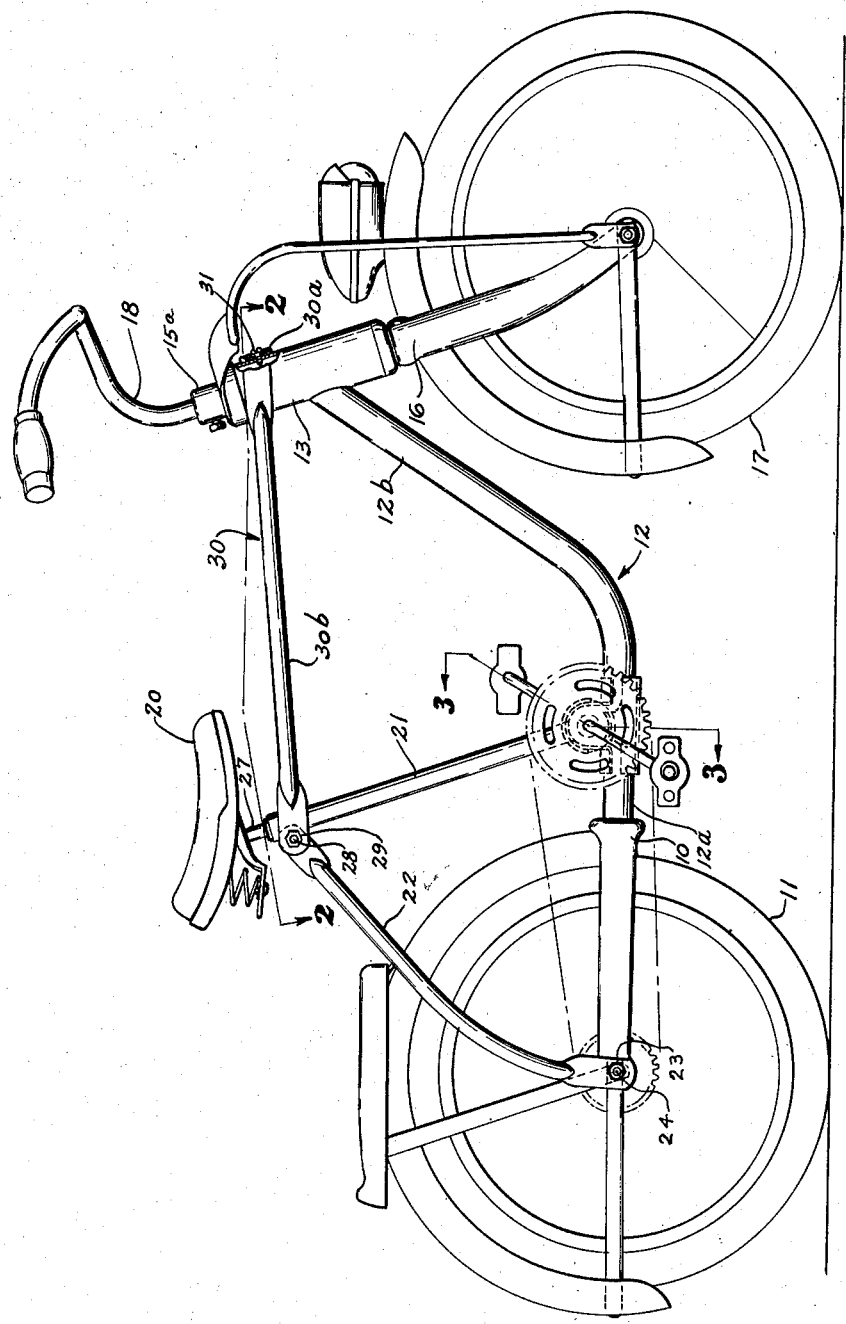

United States Patent Office 2,798,739
Patented July 9, 1957

2,798,739
KNOCKDOWN BICYCLE CONSTRUCTION

Viktor Schreckengost, Cleveland Heights, and Gilbert B. Hahn, Lyndhurst, Ohio, assignors to The Murray Ohio Manufacturing Company, Cleveland, Ohio, a corporation of Ohio Application May 18, 1953, Serial No. 355,614

3 Claims. (Cl. 280—287)

The present invention relates to bicycles and, more particularly, to a frame structure for a smaller type child's bicycle.

In the manufacture of bicycles, particularly those of the smaller type for juvenile use, it is advantageous to have a construction which is adapted not only for production at such cost that a low retail sales price may be offered, but also that the bicycle be serviceable and rugged in construction, attractive in appearance and in design features to the purchaser, and further, for convenience in mass distribution, that the structure permit of shipping in sub-assembled units of such character that the bicycle may be packaged in a small container and yet may be correctly assembled by a distributor or purchaser in a fool-proof ready manner. Also in view of purchaser demand for both boy's and girl's type frame design, it is desirable that the frame construction be adaptable for use in or conversion to either type design, both for manufacturing purposes and flexibility of vendors' stocks.

The bicycle frame of this invention comprises a horizontal rear wheel fork and a front head post tube joined by a central or beam member brazed thereto, an upwardly extending seat supporting mast tube secured at its bottom end to the central member, and a pair of struts extending from the rearward portions or prongs of the rear wheel fork to the upper end of the seat supporting member. A generally horizontal strut member, necessary in a boy's type frame design, is provided extending from the head post tube to a common attachment with the strut members to the seat supporting tube. As a sub-assembly unit, the pedal crank is provided with a ball type bearing unit which is adapted to be clamped in position in the central member by a clamping system which also serves to anchor the lower end of the seat support tube in the frame.

The pedal crank bearing mounting or clamping structure is adapted for the use of a hub and bearing unit of the type used in a bearinged spoked front wheel, whereby the pedal crank is journaled for smooth, low-effort pedalling, while avoiding the manufacture of an additional type bearing beyond what is required for the wheels.

The size of the sub-assembly units is such that the bicycle may be shipped from the manufacturer in a package of minimum size.

Further, the manner of mounting the pedal and bearing sub-assembly is such that the sprocket wheel of the unit is readily and correctly positioned and aligned when the bicycle frame is finally put together by a distributor or purchaser.

An object of the present invention is the provision of a bicycle frame structure such that the bicycle may be shipped in sub-assembled form in packaging of minimum size. Another object of the invention is the provision of a bicycle frame structure adapted to shipping in sub-assembled units of such character that the bicycle may be finally assembled in correct fashion with a minimum of final assembly operations. A further object of this invention is the provision of a bicycle having a chain drive wherein the pedal-sprocket unit is journaled in a bearing structure identical in type with a bearinged hub structure as may be used in a front wheel of the vehicle.

Other objects and advantages of the invention will appear from the following description and the drawings wherein:

Fig. 1 is a side elevational view of a bicycle of this invention;

Fig. 2 is a detailed view of part of the bicycle frame structure taken substantially as indicated by the line 2—2 in Fig. 1;

Fig. 3 is a sectional detailed view of the pedal bearing and mounting taken substantially along the line 3—3 in Fig. 1; and Fig. 4 is a cross sectional view taken substantially along the line 4—4 of Fig. 3 with part of the near end of the bearing assembly broken away to emphasize the form of the clamp structure.

In the drawings there is shown a bicycle structure embracing the present invention having a main frame unit comprised of a generally horizontally disposed rear fork member 10 between the prongs of which the rear wheel 11 is mounted upon a fixed threaded axle; a central tubular member 12 having a straight portion 12a, for mounting the pedal and sprocket assembly for the chain drive, extending forwardly from and secured to the yoke portion of the rear fork 10 and an oblique upwardly extending forward reach 12b; and a tubular head structure on forward reach 12b, including an outer tube 13 and a spaced inner tubular sleeve member 14 secured coaxially to 13 to provide a journal for the fork stem tube 15 of a front wheel fork 16 between the prongs of which a fixed axle is secured mounting the front wheel 17. The member 12 is pressed into an inwardly flanged aperture formed in the yoke portion of the pressed metal rear wheel fork and brazed thereto. In a similar fashion, the upper end of the forward reach 12b is pressed into an aperture in the outer tube 13 of the head structure and brazed thereto.

The rear wheel has a hub sprocket whereby it is driven through a chain by pedal sprocket 34, while front and rear fenders are provided which are supported by the fork members and by fender struts secured at the fork prongs on the wheel axles, all according to common practice of the prior art. Also a luggage rack is shown, supported by struts secured to the rear axle and by a transverse member connecting struts 22, to which the rack and rear fender may be commonly bolted. In the collar 15a, disposed about the upper end of fork stem tube 15 above the head post tube, a set screw is threaded which extends through an aperture in tube 15 to bear on the stem of handle bars 18 inserted into the tube 15, whereby the fork is retained in the head post and the handle bars are held in adjusted position.

To support seat 20 the frame includes a straight tube member or seat post reach bar 21, mounted as hereinafter described at its lower end to the straight portion 12a of member 12, and also includes a pair of supporting struts 22 with upper ends anchored to tube 21 and perforated lower ends fixed relative to the prong ends of rear fork 10 by nuts 23 threaded onto the ends of rear axle 24 projecting through slotted ends of the prongs and through the perforated strut ends. A roughly U-shaped heavy pressed metal clip 25 with rearwardly extending perforated ears is shaped to embrace, over approximately a semi-cylindrical extent, the upper end of member 21 to which it is brazed or welded. Tube 21 is slotted downwardly between the ears of clip 25 and provided with a split clamp sleeve insert 26 for receiving the seat post 27. The perforated upper ends of struts 22 are disposed against the outer faces of the ears on clip 25, and the bolt 28 passed through the perforations in struts 22 and the ears of the clip, when secured by a nut 29, not only anchors the upper ends of the struts 22 to tube 21, but also clamps the seat post in adjusted position by compressing the slotted end of tube 21 and the split sleeve 26 about the seat post 27.

To provide a boy's type design, an elongated U-shaped horizontal strut member 30 is used with a front or yoke portion 30a conformed in shape with, and secured by a metal screw 31 to, the front portion of the fork post 13 and with the legs 30b thereof extending rearwardly to a position outward of struts 22 and also secured by the bolt 28 passed through slots or perforations in the leg ends. This strut member, not essentially a re-enforcing member subjected to stress in the frame, is primarily a means whereby a particular bicycle or model may be readily changed from a boy's type bicycle with the strut member in position to a girl's type bicycle with the strut removed to provide a clear space forward of the seat and above the pedals. The strut member 30 and likewise members 22 may be formed of flat strip stock shaped along the major portion of the lengths to a cross-section providing structural re-enforcement, or they may be formed from tubular stock with ends flattened and apertured to provide bolt holes; and, in the case of member 30, also with the yoke portion flattened and shaped to conform to the surface disposition of the head post tube 13.

The pedal-sprocket assembly and its mounting, best seen in Fig. 3, comprises a sub-assembly of pedal crank 33 with rigidly attached chain sprocket 34, and a crank bearing unit, designated by the general reference numeral 35, the cylindrical housing of which has at each end a circumferential beaded collar or flange 36; and, as the pedal axle bearing unit mounting, upper and lower bearing clamp plates or members 37 and 38 in the form of metal stampings disposed above and below the straight portion 12b of lower front reach bar or beam member 12 and secured thereto by nuts 49 and bolts 41 passed through aligned apertures in the ends of the clamps and beam member 12. These clamp members are adapted in shape to conform to the adjacent cylindrical surface of member 12 and also to engage the beaded collars 36 on the crank bearing housing. The driving sprocket 34 is shown with its center portion dished outwardly for brazing to the pedal crank axle, while permitting the plane of the sprocket teeth to be coplanar to the driven rear sprocket.

The upper clamp member 37 has a transversely extending body portion 42 of inverted U-shape to receive the transversely disposed pedal bearing unit 35 and has semi-circular lateral end projections 43, arcuate in radial cross-section to provide groove formations conformed to and embracing the bearing unit collars 36, while the projecting ears 44, perforated to receive bolts 41 and conformed to the upper surface of member 12, provide tangs for mounting to the latter. The lower end of the tubular seat post mast 21 is brazed or welded to the clamp body portion 42 as a sub-assembly unit, whereby the clamp member 37 serves to mount the tube 21 to member 12.

The lower clamp member 38 has a main body portion 45 of substantially semi-cylindrical form, perforated at each end for bolts 41 and conformed to the lower side of beam member 12, with side ears 46 extending upwardly to terminate in arcuately formed laterally projecting end portions 47 shaped to conform to and to receive the lower side of each of the beaded collars 36.

The crank bearing unit 35, as here shown, is preferably the same as the hub and bearing unit used in the spoked front wheel of the bicycle, and here is formed of a barrel or hub sleeve 50 into which the centrally apertured, cup-shaped outer ball bearing races 51 are pressed fitted to bear against the circumferentially spaced nibs or stop formations 52 inward of each end; centrally apertured cap members 53 pressed onto the barrel ends and retaining the outer races therein; inner races 54 and balls 55 between the races; and an inner or axle sleeve 56 passed through the inner races, which serves as a retainer for the inner races and bearing balls. Outward ridges or crimps 56a are provided inward of each end of the inner sleeve to serve as spacer stops for the inner races, while the extreme end portions of the inner sleeve are flared outwardly to embrace the curved outer portions of the inner races and clamp them in position. To maintain the pedal crank in correct position, spacing washers 58, 59 are interposed between the ends of sleeve 56 and sprocket 34 and the axle nibs 60.

The collars 36 are here the hub flange portions to which are anchored the hub ends of the front wheel spokes in a bearing unit such as 35 used as a front wheel hub, and may be formed integral with caps 53 by beading a multiply end-slotted cylindrical portion of a partially formed cap about a bead ring 57. The resultant structure in collar 36 provides spoke apertures through the collar inward of ring 57 corresponding in number to the end slots used in forming the cap. By the use of such structure, where unit 35 is identical with that used for a ball bearinged hub in the front wheel, not only is a low friction pedal bearing provided, but also the cost of fabrication of the improved bicycle is lower, because of the identity.

The pedal crank 33 is formed of rod stock, and assembled, preferably as follows: The sprocket wheel is located on a straight rod and brazed in place; the washer 58, the bearing unit 35 and the second washer 59 slid onto the rod successively into position, and the rod staked at 60 to provide the nibs locating the rod in the bearing unit, while portions of the rod extending from the bearing unit are bent into final crank shape and nibbed to provide the two pedal arms. Thereafter, the pedals themselves may be located and secured on the pedal arms to complete the pedal and bearing sub-assembly, which is mounted on member 12 by the means above described.

With the frame structure above described, it is apparent that the same basic structure may be used in the manufacture of a boy's or girl's type bicycle, for the horizontal strut member 30 may be separately fabricated as needed and may be added to the basic frame structure by the simple fastening means described to produce the boy's type frame design. Moreover, manufacture of the bicycle is simplified, since the bearing unit for the pedal crank structure may be the same as a spoke type front wheel hub which is readily and securely mounted, as part of a pedal and chain sprocket sub-assembly, by the mounting clamp means to the main frame sub-unit comprised of rear fork, beam members and head post; and also since the mounting means for the bearing unit serves as well to mount one end of the seat post mast tube which comprises a sub-assembly unit with one portion of the bearing mounting members. Where it is desired to ship the bicycle in compact form, the packaging is facilitated by the fact that struts 22, seat mast 21 with attached bearing clamp member 37, horizontal member 30, and the sprocket pedals with bearing 35 as a sub-unit, may be packed as sub-assemblies unattached to the main frame unit, which nonetheless may be readily assembled in simple manner with few operations.

We claim:

1. In a child's type bicycle having a pedal sprocket chain driven rear wheel, a frame comprising: a main frame unit including a rear wheel fork, a front fork stem-journalling head post tube and a lower single tubular beam member rigidly connecting the rear fork to the head post tube; an upper and a lower clamping member mutually adapted in form for bolting in diametric disposition respectively on the top and bottom regions of the beam member and formed to receive and clamp therebetween a pedal sprocket bearing housing disposed transversely to said beam member; a single tube upwardly extending seat supporting mast member having its lower end rigidly secured to said upper clamping member to form therewith a frame sub-assembly unit, and securing means extending through the upper and lower clamping members and the tubular beam member for securing the upper and the lower clamping members to the tubular beam member.

2. In a child's bicycle of the knock down frame type having a single horizontally extending lower tube adapted to connect the lower rear fork of the frame to the head post tube of the frame: a seat post mast tube detachably mounted upon the horizontally extending lower tube, upper and lower clamping members provided with tube embracing formations adapted to fit upon and embrace respectively top and bottom areas on the said lower tube, said seat post mast tube being integrally affixed to the upper clamping member, said upper and lower clamping members having cooperating opposed concave formations adapted to receive and clamp therebetween a crank hanger bearing hub assembly top side of and transversely to the lower tube with a single piece crank hanger bearinged in a hub, and securing means extending through the lower tube and the upper and lower clamping members for securing said clamping members with bearing hub assembly and the seat post mast tube to the lower tube.

3. In a child's bicycle of the knock down frame type having a single horizontally extending lower tube adapted to connect the lower rear forks of the frame to the head post tube of the frame: a seat post mast tube detachably mounted upon the horizontally extending lower tube, upper and lower clamping members provided with tube embracing formations adapted to fit upon and embrace respectively top and bottom areas on the said lower tube, said seat post mast tube being integrally affixed to the upper clamping member, said upper and lower clamping members having cooperating opposed concave formations, a crank hanger bearing hub assembly disposed top side of and transversely to the lower tube with a single piece crank hanger bearinged in a hub, said crank hanger hub having radial flanges formed at the ends thereof and said opposed concave formations having arcuate grooves in which the hub flanges fit, and securing means extending through the lower tube and the upper and lower clamping members for securing said clamping members with bearing hub assembly and the seat post mast tube to the lower tube.

References Cited in the file of this patent

UNITED STATES PATENTS

| | | |
|---|---|---|
| 500,177 | Winton | June 27, 1893 |
| 529,861 | Hersh | Nov. 27, 1894 |
| 558,929 | Bolte et al. | Apr. 28, 1896 |
| 986,596 | Schenck | Mar. 14, 1911 |
| 1,563,094 | Ledig | Nov. 24, 1925 |
| 1,610,016 | Kuchta | Dec. 7, 1926 |
| 1,703,174 | Roe | Feb. 26, 1929 |
| 1,744,417 | Schwartz | Jan. 21, 1930 |
| 1,863,859 | Kraeft | June 21, 1932 |

FOREIGN PATENTS

| | | |
|---|---|---|
| 882,791 | France | Mar. 8, 1943 |